United States Patent [19]

Caron et al.

[11] 4,046,437
[45] Sept. 6, 1977

[54] COMBINATION CABINET FOR AUDIO-VISUAL TEACHING

[76] Inventors: Aristide Leon Caron; Paulette Marie Laure Caron, both of 10, rue de Limoges, 78000 Versailles, France

[21] Appl. No.: 632,115

[22] Filed: Nov. 14, 1975

[30] Foreign Application Priority Data

Nov. 19, 1974 France .................. 74.38044

[51] Int. Cl.² ............... A47B 81/06; G03B 21/28
[52] U.S. Cl. ................. 312/20; 312/7 TV; 312/196; 35/60; 350/276 R
[58] Field of Search ............... 312/20, 209, 7 TV; 35/60; 350/276 R

[56] References Cited

U.S. PATENT DOCUMENTS

| | | | |
|---|---|---|---|
| 1,827,598 | 10/1931 | Merriman | 312/20 |
| 2,082,170 | 6/1937 | McRae | 350/276 R |
| 2,238,267 | 4/1941 | Katz | 35/60 |
| 2,304,490 | 12/1942 | Yoder | 312/20 |
| 2,413,922 | 1/1947 | Jensen et al. | 312/7 TV |
| 2,477,923 | 8/1949 | Fitt | 312/20 |
| 2,821,109 | 1/1958 | Nicol | 350/276 R |
| 3,471,947 | 10/1969 | Genser | 35/60 |
| 3,728,801 | 4/1973 | Beckman et al. | 35/60 |
| 3,728,801 | 4/1973 | Beckman | 312/196 X |

FOREIGN PATENT DOCUMENTS 516,631  1940  United Kingdom ............ 312/7 TV

*Primary Examiner*—Paul R. Gilliam
*Assistant Examiner*—Victor N. Sakran
*Attorney, Agent, or Firm*—Beveridge, DeGrandi, Kline and Lunsford

[57] ABSTRACT

A combination cabinet for audio-visual teaching comprises a projection screen which is mounted for pivoting into an operational position in which it receives by rear projection an image from a projector after reflection of the image light rays by a mirror within the cabinet, and further comprises a pivoting console housing an audio-signal reproducer, the console pivoting from a position in which the reproducer is within the cabinet to a position in which the reproducer controls are presented to an operator, preferably on the same side of the cabinet as the projector controls. A loudspeaker, supplied from the audio-signal reproducer, is mounted in the front face of the cabinet.

2 Claims, 3 Drawing Figures

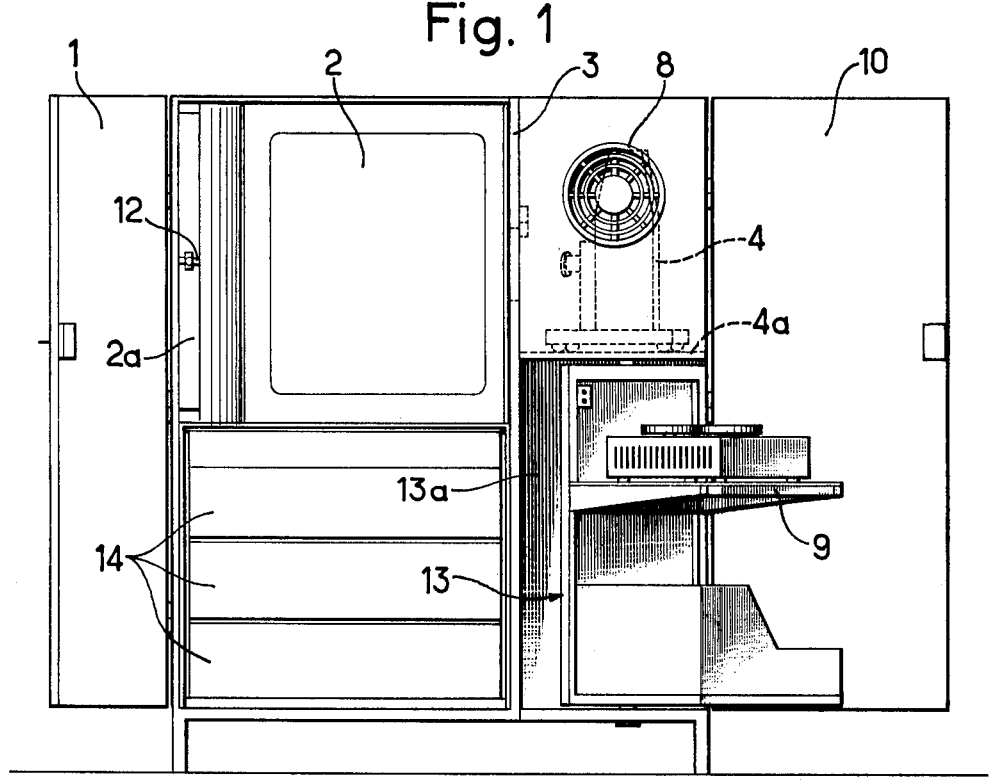
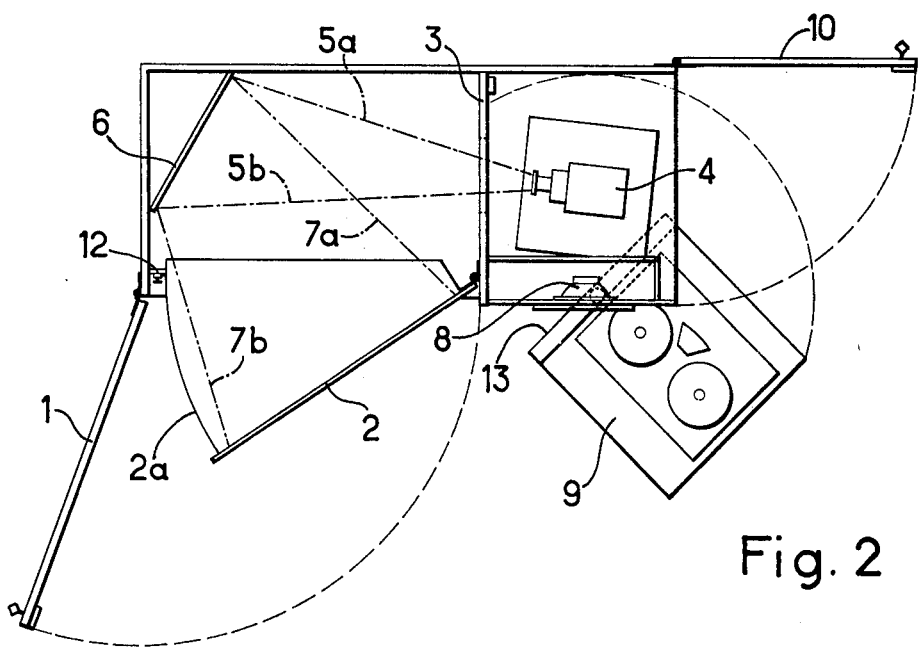

COMBINATION CABINET FOR AUDIO-VISUAL TEACHING

The present invention relates to a combination cabinet for audio-visual teaching, able to contain all the elements required for the said teaching, both in connection with the loudspeaker and the phonograph or tape recorder and audio frequency amplifier for providing the loudspeaker signals, and in connection with the projector and the projection screen, the screen being of the rear-projection type.

In this new cabinet, the screen is mounted for pivotal motion on a vertical partition located in the neighborhood of the medial part of the said unit in such a manner that it can be pivoted, for use, outside the said unit and into a position visible from all points of a classroom or conference room within which are distributed the pupils or listeners for which the said audio-visual teaching is intended.

Another important feature of the combination cabinet or combined unit according to the present invention lies in the fact that it contains a vertical mirror provided to reflect the light rays from a fixed projector contained in the said cabinet, on to the whole of the surface of the said screen, when this screen is in its position of use, and which allows the optical path between the said projector and the said screen to be lengthened, while restricting the distance between this projector and this screen, as well as reducing the bulk of the said combined unit.

Finally, another essential feature of the said combined unit lies in the fact that its turntable or taperecorder is mounted in the lower part of this unit, under the space provided for housing the projector and the loudspeaker, on a pivoting console having a front face which can be turned into the plane of the front face of the said unit when the unit is not in use, and of which the pivotal axis is placed at a small distance from this front face to permit the said console to be turned, after the initial opening of a lateral door arranged perpendicularly to the front face of the unit, into a position which is sufficiently spaced from the wall against which the unit is placed to allow a teacher or lecturer to place himself behind the said turntable or taperecorder and to be able to control simultaneously this turntable or taperecorder and the said projector in order to ensure, for example, successive projection of transparencies in synchronism with the reproduction of a sound record previously recorded on the tape or disc.

For reasons easy to understand connected with the protection of material from dust, the said unit comprises additionally on the side opposite that at which the said loudspeaker and the said projector are located, a door which when closed lies in the facade of the unit in front of the said screen and also covers a storage space, provided under the space reserved for light rays passing between the said projector and the above-mentioned mirror and the light rays reflected from the said mirror to this screen.

The features of the present invention will be better understood from a consideration of the following description, with reference to the accompanying drawings, of one embodiment of the present invention, given by way of non-limiting example. In the drawings:

FIG. 1 is a front elevation of the said combined unit in the position of use of this unit, in which the doors giving access to the pivoting projection screen and to the rear part of the said pivoting console, have been preliminarily opened and folded back, before pivoting of the said screen and the said console to their respective positions of use;

FIG. 2 is a plan view of the unit of FIG. 1; and

Figure 3:
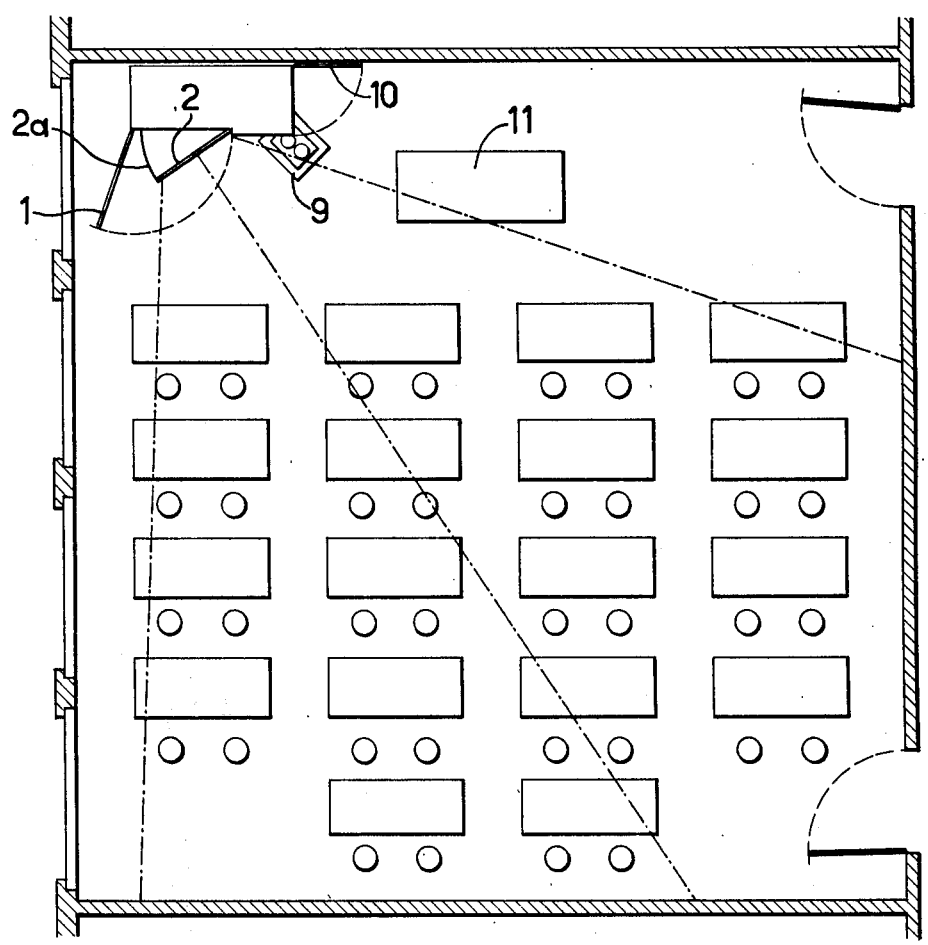
FIG. 3 shows diagrammatically the position of the said unit relative to the seats of pupils or listeners located in the said room, from which it will be seen that the said screen is visible, after pivoting, from all points of this room.

It will be seen from FIGS. 1 and 2 that the left-hand part of the said unit is normally closed by a door 1 which has been opened to its limiting position, which can be seen more clearly in FIG. 2.

The projection screen 2, which is mounted for pivotal motion on a vertical partition 3 having the required aperture for the passage of light rays, can pivot at the same time as a light shield 2a fixed to the said screen and which prevents external light from disturbing the image projected on to the rear of the said screen 2, the pivoted screen projecting outwards from the front of the unit, in the position seen in FIG. 2.

The projector 4, shown in FIGS. 1 and 2, is placed in the upper part of the said unit and is directed in such a manner that the light rays which it emits and which lie between the chain-dotted lines 5a and 5b shown in FIG. 2 all fall on a vertical mirror 6, the angle of which with respect to the back of the said unit is so chosen that the rays reflected by this mirror and which lie between the chain-dotted lines 7a and 7b in FIG. 2 all fall on the rear surface of the screen 2 in its position of use, the optical paths followed by the different light rays from the projector to the screen being substantially the same in length.

The image projected on the screen 2 is visible by transmitted light at any point in the classroom or conference room, as will be described in greater detail in connection with FIG. 3.

The unit comprises in addition, in the upper part of its facade a loudspeaker 8 which is directed towards the said room, the sound from which can be heard by all the pupils or listeners who are in the room.

In the lower part of the said unit, under the said projector and the said loudspeaker, is a housing for a pivoting console 9, seen in its position of use in FIGS. 1 and 2.

To permit this console to be pivoted, a door 10, which normally closes the right-hand side of the unit, has to be opened to the position shown in FIGS. 1 and 2.

It will be understood that the teacher or lecturer, who normally positions himself behind the table or desk 11 shown in FIG. 3, after pivoting of the said pivotal console 9 to the position shown in FIGS. 1-3 can simultaneously control the sound reproduction apparatus which is located on this pivoting console 9 and the projector 4 which is fixed on a shelf 4a shown in FIG. 1.

It will also be noticed that the screen 2, in the position in which it is folded back into the space reserved for the passage of light rays, abuts against a stop 12 which is far enough back to allow the closure of the door 1, and also that the pivoting console 9 comprises a front face 13 which, in the position in which this console is pivoted back into the unit, closes the forward part of the space 13a reserved for the housing of the said pivoting console, below the said projector 4 and the said loudspeaker 8.

In the closed position of the doors 1 and 10, the unit thus appears as an integral closed cabinet, comprising only a single orifice in its upper part for the mounting of the loudspeaker 8.

In FIG. 1, there are shown storage drawers 14 which can of course be replaced by simple shelves, in which case internal doors can be provided if necessary behind the door 1 to protect documents placed on the shelves.

It will be understood that various modifications, improvements or additions can be made to the embodiment which has been described, and that certain elements can be replaced by equivalent elements without affecting the general nature of the invention.

One can, for example, reverse the respective positions of the pivoting console 9 and the projection screen, as well as those of the doors 1 and 10, according to the position provided for the said unit within the classroom or conference room.

It will also be seen that the said pivoting console can be placed under the pivoting screen, with a modification of the position of the pivotal axis of this console, in such a manner as to allow the controls for the turntable and the tape recorder to be brought close to the teacher or lecturer, who must, in order to operate the projector, always place himself in front of the door 10 folded against the wall against which the said combined unit is arranged. In the latter case, a storage space can be provided under the said projector and the said loudspeaker.

We claim:

1. An audio-visual teaching apparatus comprising a cabinet, a projector mounted in said cabinet, a projecting screen mounted on said cabinet for movement between a stored position and a use position projecting forwardly from the facade of said cabinet, a mirror mounted within said cabinet and so oriented with respect to said projector as to reflect luminous rays emitted therefrom onto said screen in its use position, said screen being of a sufficient size to be seen from all points of a room such as a classroom in which the apparatus is used and being supported for pivotal movement about a vertical axis in the upper part of said cabinet for limited pivotal movement out of said cabinet to said use position to thereby increase the optical path of the luminous rays emitted by said projector and thereby increase the size of the image projected without increasing the size of said cabinet, said mirror being positioned in said cabinet so that all rays emitted from said projector pass through paths of substantially equal length to said screen in said use position, audio means including a speaker mounted within the upper portion and on the facade of said cabinet and a record player and amplifier, a console concealable in the lower portion of said cabinet and mounted for pivotal movement between a stored position and a use position, said pivotal movement of said console being about a vertical axis, said console having a facade which is in alignment with the facade of the cabinet when the console is in its stored position, said facade of the console projecting outwardly from the cabinet when the console is in its use position, said record player and amplifier and the controls therefor being mounted on said console for pivotal movement therewith between a stored position within said cabinet and a use position wherein the controls therefore are in close proximity to the controls for said projector and wherein there is provided in the rear of said console a space permitting a teacher to simultaneously operate the controls of the audio means and projector while facing the audience and remaining rearward of the facade of the cabinet so that the vision of the images projected on said screen is not obstructed and a commentary thereon is possible.

2. The audio-visual teaching apparatus according to claim 1 further comprising a light screen mounted on said projecting screen, said light screen cooperating with said cabinet to prohibit daylight from entering said cabinet and disturbing the image projected on said screen.

* * * * *